United States Patent
Ruan

(10) Patent No.: US 9,464,673 B2
(45) Date of Patent: Oct. 11, 2016

(54) PUNCHING SHEET-TYPE FLANGE

(75) Inventor: Xiaoding Ruan, Zhejiang (CN)

(73) Assignee: ZHEJIANG LINIX MOTOR CO., LTD., Hengdian Electronic Industry Zone, Dongyang, Zhejiang (CN)

(*) Notice: Subject to any disclaimer, the term of this patent is extended or adjusted under 35 U.S.C. 154(b) by 643 days.

(21) Appl. No.: 13/879,386

(22) PCT Filed: May 18, 2012

(86) PCT No.: PCT/CN2012/075687
§ 371 (c)(1),
(2), (4) Date: Apr. 12, 2013

(87) PCT Pub. No.: WO2012/167689
PCT Pub. Date: Dec. 13, 2012

(65) Prior Publication Data
US 2013/0202351 A1    Aug. 8, 2013

(51) Int. Cl.
*F16B 5/00* (2006.01)
*F16D 1/033* (2006.01)
*F16D 3/79* (2006.01)

(52) U.S. Cl.
CPC .............. *F16D 1/033* (2013.01); *F16D 3/79* (2013.01); *Y10T 403/64* (2015.01)

(58) Field of Classification Search
CPC .......... F16D 1/033; F16D 1/079; F16D 3/79; B29C 65/562; F01D 25/243; Y10T 403/64
USPC .................................................. 403/335–337
See application file for complete search history.

(56) References Cited

U.S. PATENT DOCUMENTS

| | | | | |
|---|---|---|---|---|
| 1,311,912 A | * | 8/1919 | Peterson | F16H 55/16 464/99 |
| 5,093,599 A | * | 3/1992 | Horng | 310/216.092 |
| 5,564,461 A | * | 10/1996 | Raymond et al. | 137/315.35 |
| 5,645,363 A | * | 7/1997 | Dafforn et al. | 403/3 |
| 6,748,967 B1 | * | 6/2004 | Smiltneek | 137/315.17 |
| 6,869,081 B1 | * | 3/2005 | Jenco | 277/611 |
| 7,361,092 B2 | * | 4/2008 | Pawlowski et al. | 464/23 |
| 7,837,564 B2 | * | 11/2010 | Farahati et al. | 464/69 |
| 7,938,631 B2 | * | 5/2011 | Lisi et al. | 417/360 |
| 2009/0305796 A1 | * | 12/2009 | Widdall et al. | 464/147 |

* cited by examiner

*Primary Examiner* — Gregory Binda
*Assistant Examiner* — Nahid Amiri
(74) *Attorney, Agent, or Firm* — Global IP Services; Tianhua Gu

(57) ABSTRACT

A sheet-type flange for transmitting power is formed by a substrate and a multiple of flange sheets. The substrate has a central axle hole with a square key slot and a multiple of fixed holes distributed around the axle hole. The multiple of flange sheets are annular and have connection slots arranged on a periphery of the flange sheets, as well as the multiple of flange sheets are arranged on both sides of the substrate respectively. The substrate and the multiple of flange sheets are fixed together by rivets.

4 Claims, 3 Drawing Sheets

PUNCHING SHEET-TYPE FLANGE

CROSS REFERENCE TO RELATED PATENT APPLICATION

The present application is the national stage of PCT/CN2012/075687 filed on May 18, 2012, which claims the priority of the Chinese patent application No. 201110153939.8 filed on Jun. 9, 2011.

TECHNICAL FIELD OF THE INVENTION

The invention belongs to the field of transmission connection, particularly relates to a punching sheet-type flange formed by overlapping and fixing punching sheet-structure assemblies for transmission.

BACKGROUND OF THE INVENTION

The traditional flanges are mostly processed by die-casting, so they are of integral structures. Even for a weld neck flange, it is also formed by processing two flange assemblies by die-casting and then integrally fixing the two flange assemblies by welding, and such weld neck flange is common in pipe welding.

After a flange is processed, the thickness of the flange is non-adjustable, and each kind of flange has a respective installation thickness. When the connection thickness of the flange is changed, it is needed to replace the flange with a suitable flange, and a flange with a suitable installation thickness is to be adopted and then installed. Therefore, even if the installation diameter is equal, the flange structures may also vary in thickness specifications. If the thickness of the flange is appropriate, several thin flanges may be installed by overlapping, but this installation manner is not always convenient.

The existing connection of flanges is achieved by bolts, therefore, connection pieces are generally provided with connection holes for bolts. Or, flanges are fixed to the end parts of the connection pieces, the connection of the connection pieces becomes connection of two flanges, and then the two flanges are connected by bolts. If the end parts of the connection pieces are unsuitable to process connection holes for bolts or unsuitable to fix flanges due to their shape structures, the traditional flanges can not be used. Therefore, a flange suitable for this case is in urgent need.

The existing flanges are generally circular, with connection holes processed on the flanges for bolts to pass through. So the structure is relatively simple, and such flanges can be processed by die-casting. However, as some connection pieces have relatively complex structure, the connected flange structures appear different from the traditional flange structures. It becomes very difficult to process flanges by the traditional die-casting way at this time.

The Patent Office of China published a patent No. CN2566088Y on Aug. 13, 2003, titled FLANGE FOR RUBBER JOINT. This flange comprises a flange main body, wherein the flange main body is formed by combining multiple sector plates through a connection mechanism. The structure of the flange main body formed by combing multiple sector plates is still a circular structure, and the installation of the flange is still achieved by bolt connection, so this flange is not suitable for connection pieces with non-bolt connection.

The Patent Office of China published a patent No. CN2694084Y on Apr. 20, 2005, titled COMBINED STEEL-PLASTIC COMPOSITE FLANGE. This flange is formed by splicing and then bonding two symmetrical steel-plastic composite semicircular rings with metal gasket therein. The steel-plastic composite semicircular rings are provided with connection holes for bolts to pass through. The two ends of the steel-plastic composite semicircular rings are provided with step-shaped bonding surfaces for the two steel-plastic composite semicircular rings to splice. The composite members are formed by die-casting and then still connected by blots after spliced, so this flange is not suitable for connection pieces with non-bolt connection.

SUMMARY OF THE INVENTION

The purpose of the invention is to provide a punching sheet-type flange processed by punching processing and then assembled, to solve the difficulty in die casting of flanges having complex structures.

The invention also solves the problem of flange thickness being not adjustable, and provides a punching sheet-type flange. The thickness of the flange can be changed by adjusting the number of the punching sheets to adapt the connection of various thicknesses.

The purpose of the invention is to provide a punching sheet-type flange connected by splicing, to solve the defect that the traditional bolt connection is inconvenient.

The purpose of the invention is to provide a punching sheet-type flange which can connect two connection pieces while playing a role of transmission.

The following technical solution is employed in the invention to solve its technical problems. A punching sheet-type flange is provided, comprising a substrate and multiple flange sheets fixed with the substrate. The substrate and the flange sheets are of a punching sheet structure. The flange sheets are annular, and connection slots are arranged on the periphery of the flange sheets. The flange sheets are arranged on both sides of the substrate. The substrate is mainly used for separating two sides of a flange, so that the connection pieces connected on both sides of the flange are separated at the location of substrate and will not cause interference, and the superposition parts where the connection pieces on both sides of the flange are connected with the flange meet the requirements of self-connection of the connection pieces without cases that the superposition parts are larger or smaller than the set dimension. The depth of the connection slots may be changed by adjusting the number of the flange sheets so as to adjust the superposition dimension of the connection slots and the connection pieces. The connection dimension with the connection pieces may be changed immediately by increasing or reducing the flange sheets, meanwhile, the substrate is also a part connecting the flange sheets on both sides. Both the substrate and the flange sheets are of sheet structures, and are processed by punching. The two sides of the substrate are formed of multiple flange sheets by overlapping. The combination structure of the flange sheets on both sides of the substrate maybe made complex, but the structure of the flange sheets themselves maybe simplified. It is convenient to manufacture the flange sheets by punching, the machining efficiency is relatively high, and the machining precision may be improved. Both the substrate and the flange sheets are of annular structures, or only the flange sheets are of an annular structure. The flange sheets are placed on both sides of the substrate to be convenient to connect with the connection pieces on both sides. The connection of the connection pieces is achieved by splicing, such manner is suitable for the connection of complex connection pieces, particularly some connection pieces, the end parts of which are unsuitable for arrangement of threaded holes for bolt connection, and in this case, it is convenient to implement connection by splicing. The shape of the connection slots may be set according to the shape of the end parts of the connection pieces. The connection slots may be triangular, square or circular or in other shapes according to the machining shape suitable for the connection pieces. Sometimes, the connection slots of each flange sheet may be processed into different dimensions to prevent the connection pieces from separating from the flange. The width of the connection slots on a flange sheet on the outmost side of the flange is smallest. The width of a connection slot will be greater if the connection slot is on a flange sheet closer to the substrate. The connection pieces may be pushed into the connection slots from the periphery of the connection slots for installation, so the connection slots may be open. In addition, the connection pieces may be not of an integral structure, the flange may be connected with split connection pieces, and the end part of each connection piece is provided with connection ends corresponding to the connection slots. The flange sheets may be polygonal, and the connection slots on the flange sheets may be spiral. In this way, the connection nieces may be snapped into the connection slots by rotating. The flange in the technical solution may transmit power. The flange directly transmits power to a flange sheet through a connection slot when a connection piece rotates, and then to a flange sheet on the other side through a connection fixing member of the flange sheet and finally to a connection piece on this side. Or, a transmission hole is arranged on the substrate for connecting with the transmission shaft, and the substrate transmits power to the flange sheets on both sides and then to the connection pieces, or transmits power reversely.

Preferably, an axle hole is arranged in the middle of the substrate, and a square key slot is arranged on the axle hole. The substrate is also provided with multiple fixed holes distributed coaxially with the axle hole. The axle hole in the middle of the substrate is connected with the transmission shaft and then connected with a flat key through the key slot, in this way, power may be transmitted to the flange sheets on both sides from the substrate through the transmission shaft so as to achieve power transmission, or power is transmitted to an intermediate connection shaft through the flange sheets. The connection shaft on the middle part may be located by the fixed holes.

Preferably, the substrate and the flange sheets are provided with connection holes, and the connection holes on the substrate correspond to those on the flange sheets. Rivets pass through the connection holes to integrally fix the flange sheets and the substrate. The protruded length of two ends of a rivet is short, thus less interference will be caused with the end parts of the connection pieces on both sides, or crew rods are fixed on the connection holes of the substrate and pass through the connection holes. Two ends of one crew rod are connected with the flange sheets on both sides of the substrate, and the end parts of the crew rods are fixed by nuts, in this way, the number of the flange sheets is adjusted conveniently, and the flange sheets may be increased at any time during assembling.

Preferably, the connection holes and the connection slots are mutually staggered, and a connection hole is arranged between two adjacent connection slots. The staggered arrangement enables the flange sheets to bear uniform stress, and meanwhile, the stress delivered to the flange sheet on the other side by the substrate is relatively uniform, so that the local crack of the flange caused by overlarge stress on a local part may be avoided.

Preferably, the flange sheets on both sides of the substrate are of the same shape, and symmetrically fixed on both sides of the substrate. The connection slots on the flange sheets correspond to each other, and the number of the flange sheets on both sides of the substrate is the same. This is a solution where the flange sheets on both sides are the same, including thickness, diameter, shape of the connection slots, number, and location and the like, in this case, the flange has only two components which have a simple structure and may be interchangeable.

Preferably, the dimension of the substrate is greater than that of the flange sheets. The substrate is pentagonal, and the flange sheets are annular. There are five connection slots on the flange sheets, and each one of the connection slots corresponds to one corner of the substrate. The corner of the substrate may become a blocking part or a separation part for the connection pieces inserting into components in the connection slots, to prevent the connection pieces on left and right sides from moving in the axial direction to reduce the connection dimension of the connection piece on one side and the connection slots. The specific shape of the substrate and the number of the connection slots may be changeable according to the specific requirements.

Preferably, the dimension of the substrate is greater than that of the flange sheets. Both the shape and number of the flange sheets on both sides of the substrate are different. This is another solution where the shape of the connection pieces connected with the flange sheets on both sides of the substrate is different, and the connection slots of the flange sheets on both sides of the substrate correspond to the shape of the connecting parts on the end parts of the respective connection pieces. The flange with such structure cannot be interchangeable, thus the connection manner is unique.

Preferably, the periphery of the connection slots is of an open structure, and the connection slots are in the shape of dovetail slots. The width of the connection slots on the edge of the flange sheets is smaller than that of the inner side of the connection slots, the inner side edge of the connection slots is an arc, and this arc and the arc of the inner circle of the flange sheets form a concentric structure. The splicing manner of the connection slots of the dovetail slots is axial movement rather than radial movement, so as to ensure that the connection slots will not depart from the flange due to a centrifugal force when rotating. The inner side edge of the connection slots is an arc, so that the annular width of the flange sheets on this part is equal, and the strength of the flange sheets is guaranteed.

Preferably, corners of the two side edges of the connection slots and of the inner side edges of the connection slots are provided with grooves which are in the same direction as the side edges of the connection slots.

The invention has the following advantages: the substrate combines with the flange sheets to form the flange, the substrate and the flange sheets are formed by punching, the number of the flange sheets is adjustable, flange sheets with a complex structure may be processed to accommodate connection pieces of different structures, and connection by the connection slots enables convenient assembling and replacement and improves the assembling efficiency.

Figure 1:
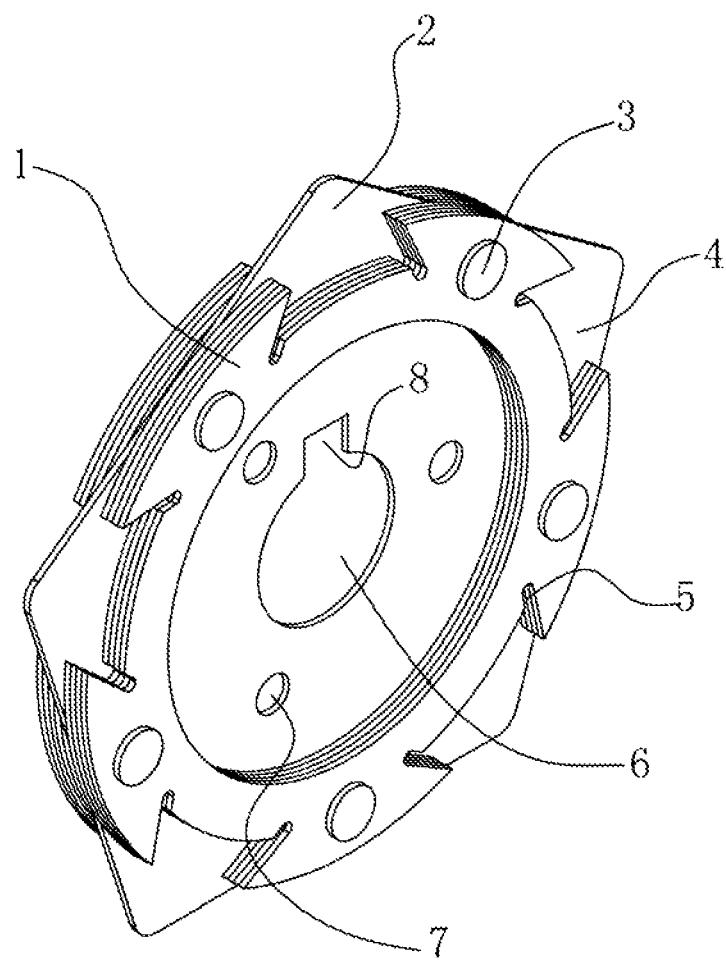
FIG. 1 is a structural diagram of the invention.

In the drawings: 1, flange sheet; 2, substrate; 3, rivet; 4, connection slot; 5, groove; 6, axle hole; 7, fixed hole; 8, key slot.

DETAILED DESCRIPTION OF THE INVENTION

The technical solution of the invention will be further described in detail below with reference to specific embodiments and drawings.

Embodiment 1

A punching sheet-type flange (referring to FIG. 1) is provided, comprising a substrate 2 and eight flange sheets 1 fixed with the substrate. The substrate and the flange sheets are of a punching sheet structure and have same thickness. The flange sheets are symmetrically fixed on both sides of the substrate, and four flange sheets are fixed on both sides of the substrate, respectively. The dimension of the substrate is greater than that of the flange sheets. The substrate is pentagonal, and the flange sheets are annular. The middle part of the substrate is provided with an axle hole 6 with a key slot 8, and the substrate is also provided with three fixed holes 7 distributed uniformly and circularly around the axle center of the axle hole. Five connection holes are arranged on the substrate, and each of the connection slots corresponds to one side of the substrate. The flange sheets are provided with connection holes corresponding to those on the substrate. Rivets 3 pass through the connection holes to integrally fix the substrate and the flange sheets. Five open connection slots 4 are arranged on the periphery of the flange sheets and correspond to the corners of the substrate, and each one of the connection slots corresponds to one corner of the substrate. The connection slots and the connection holes are mutually staggered. Corners of the two side edges of the connection slots and of the inner side edges of the connection slots are provided with grooves 5 which are in the same direction as the side edges of the connection slots.

During assembling, connecting parts fitted with the connection slots are arranged on the end parts of the connection pieces, the connection pieces move around the axis of the flange sheets, and the connecting parts are inserted into the connection slots to finish assembling. The axle hole is connected with the transmission shaft and also with the flat key. The rotation of the transmission shaft drives the flange to rotate, thereby driving the connection pieces to rotate by the connection slots on the flange sheets located on both sides of the substrate.

Embodiment 2

Figure 2:
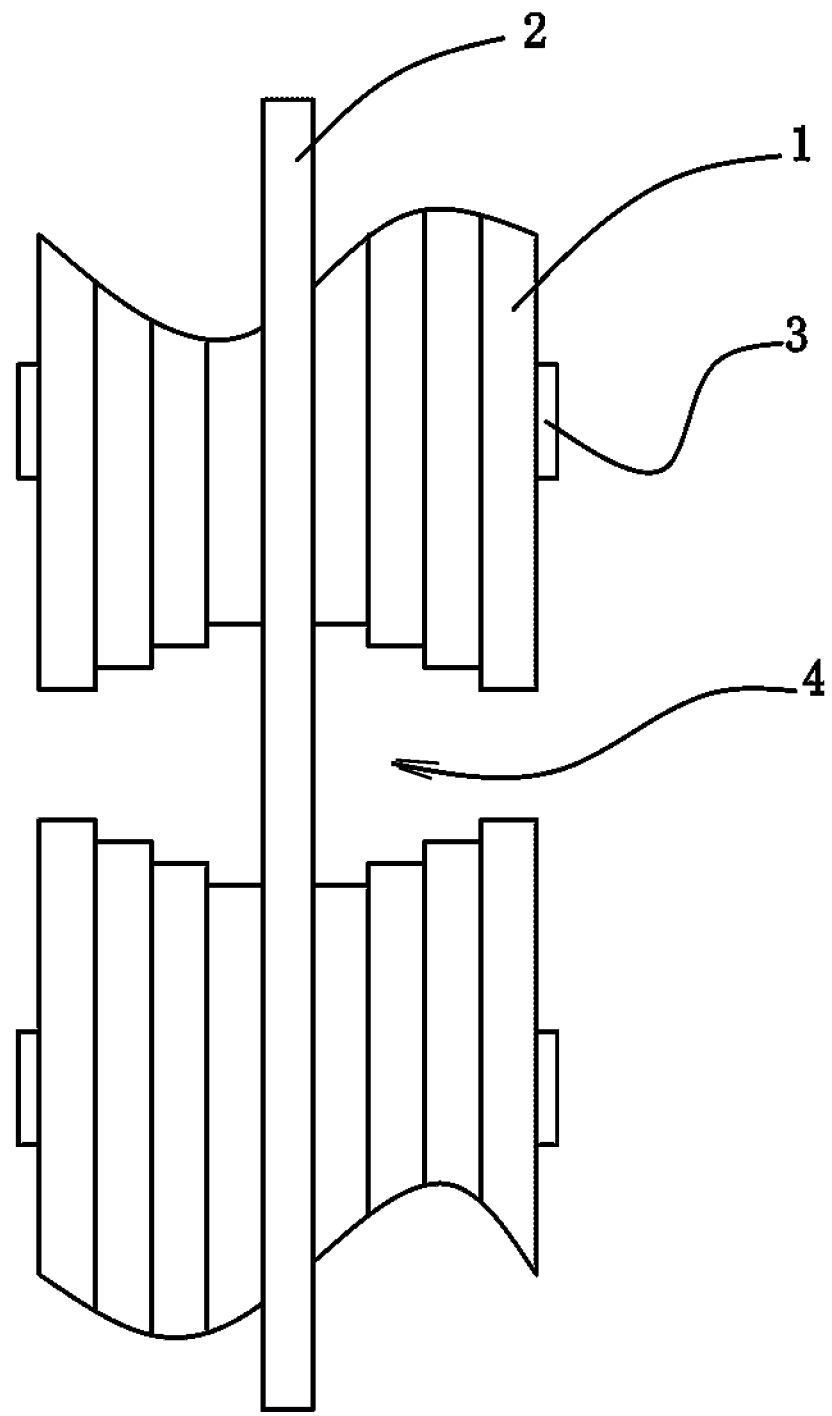
FIG. 2 is a local top view of the second solution of the invention.

A punching sheet-type flange (referring to FIG. 2) is provided. Four flange sheets 1 are fixed on both sides of the substrate 2, respectively. Each of the connection slots corresponds to one corner of the substrate, and the connection slots are in the shape of dovetail slots. The width of the connection slots on the edge of the flange sheets is smaller than that of the inner side of the connection slots, the inner side of the connection slots is arc, and this arc and the arc of the inner circle of the flange sheets form a concentric structure. The shape of the connection slots on a same flange sheet is the same, while the shape of the connection slots on the four flange sheets is different, wherein width of the connection slots on a flange sheet on the outmost side of the flange is smallest. The width of a connection slot will be greater if the connection slot is on a flange sheet closer to the substrate. The width of the connection slot close to the substrate from the outer side is gradually increased. Other structures refer to Embodiment 1.

Connection pieces are of a split structure, and the end part of each part of the connection pieces is inserted into the connection slots by means of radial movement. After the connection pieces are integrally installed on the flange, the whole connection pieces can be integrally fixed by banding or ferruling, at this time, the axial direction and the radial direction of the connection pieces are locked to finish assembling. The axle hole is connected with the transmission shaft and also with the flat key. The rotation of the transmission shaft drives the flange to rotate, thereby driving the connection pieces to rotate by the connection slots on the flange sheets located on both sides of the substrate.

Embodiment 3

Figure 3:
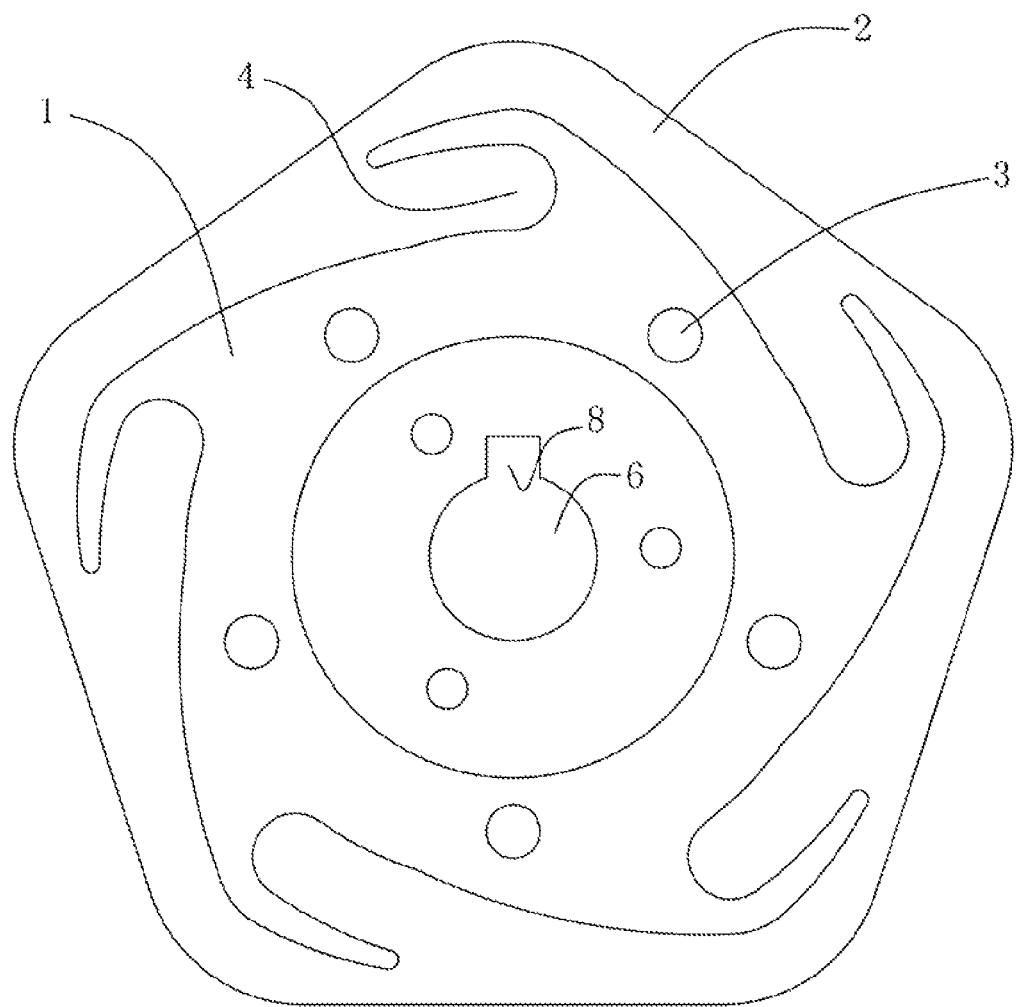
FIG. 3 is the third structural diagram of the invention.

A punching sheet-type flange (referring to FIG. 3) is provided. Four flange sheets 1 are symmetrically fixed on both sides of the substrate 2, respectively. The substrate and the flange sheets are integrally fixed by rivets 3. Five open connection slots 4 are arranged on the periphery of the flange sheets. The connection slots are arc-shaped, and this arc and the circular ring of the flange sheets form a concentric structure. The rotation direction of the five connection slots is the same, and each one of the connection slots corresponds to one corner of the substrate, and the open direction of the connection slots on both sides of the substrate is the same. Other structures refer to Embodiment 1.

During assembling, the end parts of the connection pieces are aligned with the open parts of the connection slots first, and then the connection pieces are made to rotate around the axis of the flange, so that the connecting parts on the end parts of the connection pieces are screwed into the bottoms of the connection slots to finish assembling, at this time, the flange can transmit power towards only one direction. The connection pieces may be rotated reversely to disconnect the connection pieces and the flange.

The above embodiments are just several preferred solutions of the invention and not intended to limit the invention in any form. The invention may have other variants and modifications within the technical solutions defined by the claims.

What is claimed is:
1. A. sheet-type flange for transmitting power comprising:
   a substrate, which has an axle hole with a square key slot set in a center of the substrate, a multiple of fixed holes distributed coaxially with the axle hole;
   a multiple of flange sheets, which are annular and have connection slots arranged on a periphery of the flange sheets, the multiple of flange sheets are arranged on both sides of the substrate respectively;
   the substrate and the multiple of flange sheets are provided with connection holes, and rivets pass through the connection holes to integrally fix the multiple of flange sheets with the substrate;
   the multiple of flange sheets on both sides of the substrate are of a same shape and are symmetrically fixed on both sides of the substrate, the connection slots on the multiple of flange sheets correspond to each other, and number of sheets of the multiple of flange sheets on both sides of the substrate is the same or different;
   a dimension of the substrate is greater than that of the multiple of flange sheets, the substrate is pentagonal, there are five connection slots on the flange sheets, and each one of the connection slots corresponds to one corner of the substrate.

2. The sheet-type flange according to claim 1, wherein the connection holes and the connection slots are mutually staggered, and each connection hole is arranged between two adjacent connection slots.

3. The sheet-type flange according to claim 1, wherein a periphery of the connection slots is of an open structure, the connection slots are in the shape of dovetail slots, a width of the connection slots on an edge of the flange sheets is smaller than that of an inner side of the connection slots, the inner side edge of the connection slots is an arc, and this arc and an arc of an inner circle of the flange sheets form a concentric structure.

4. The sheet-type flange according to claim 3, wherein corners of the two side edges of the connection slots and of the inner side edges of the connection slots are provided with grooves which are in the same direction as the side edges of the connection slots.

\* \* \* \* \*